March 28, 1944.　　　A. L. STAMSVIK　　　2,345,014
FILTRATION UNIT
Filed Oct. 20, 1941　　　3 Sheets-Sheet 1

INVENTOR
Alfred L. Stamsvik
BY
ATTORNEY

March 28, 1944.    A. L. STAMSVIK    2,345,014
FILTRATION UNIT
Filed Oct. 20, 1941    3 Sheets-Sheet 2

INVENTOR
Alfred L. Stamsvik
BY M. Bjourdas
ATTORNEY

March 28, 1944. A. L. STAMSVIK 2,345,014
FILTRATION UNIT
Filed Oct. 20, 1941 3 Sheets-Sheet 3
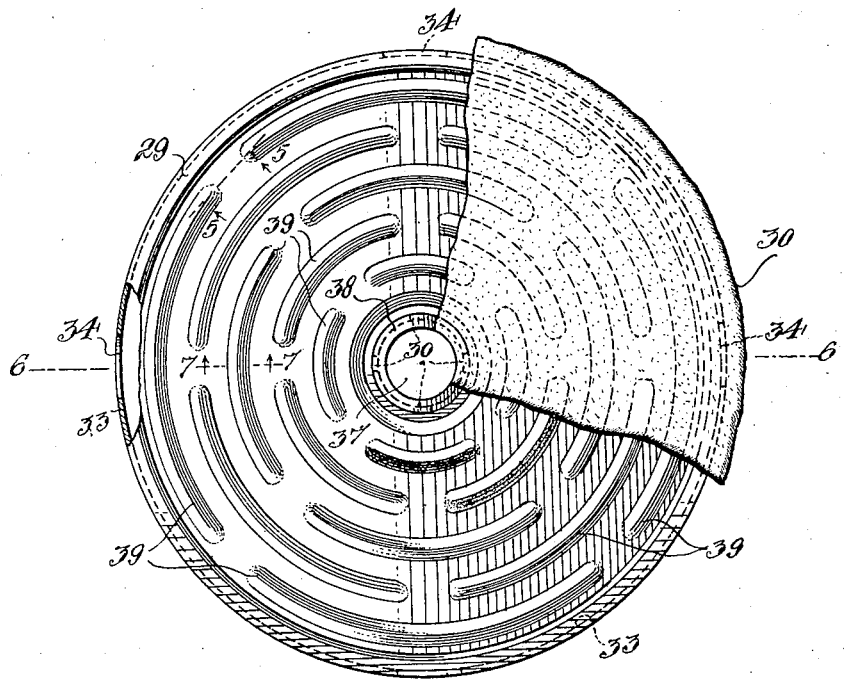
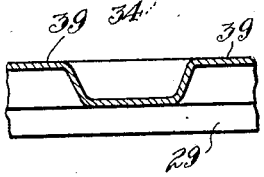
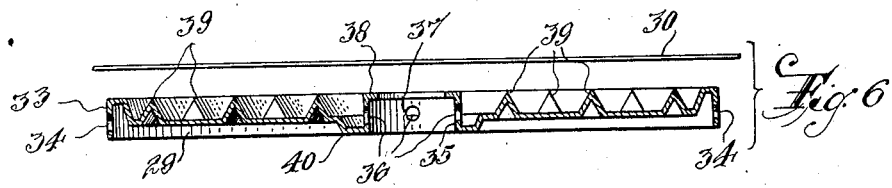
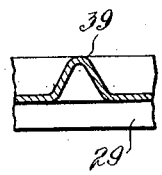
INVENTOR
Alfred L. Stamsvik
BY M. Bjorndal
ATTORNEY Patented Mar. 28, 1944

2,345,014

UNITED STATES PATENT OFFICE 2,345,014

FILTRATION UNIT

Alfred L. Stamsvik, Grove City, Pa., assignor to Stamsvik Manufacturing Corporation, Pittsburgh, Pa.

Application October 20, 1941, Serial No. 415,718

7 Claims. (Cl. 210—185)

This invention relates to improvements in filtration units for filtering large quantities of liquids at low pressures and particularly to cold raw milk filters of the multiple disc type where the milk is passed through filtering pads to remove dirt and foreign matter of any kind.

While filters have been known and used for many purposes, cold raw milk filtering has not previously been widely applied due to the large and costly filters required and due to the difficulty and time consuming process of frequently cleaning these filters. To permit the passing of large quantities of a given liquid at low pressure a filter must have a large filtering area. The cross sectional area required to pass a given quantity of milk, for instance, in a given period of time is dependent upon both the pressure applied and the viscosity of the milk. In most cases it is desirable to filter the milk in the shortest possible time and at low pressure. Filters for cold, raw milk must therefore of necessity have large cross sectional areas. Such filters were formerly made with large perforated sheet metal plates over which were placed a suitable filtering pad and sometimes a wire screen was used. Sanitary reasons, however, required frequent cleaning and it was found that the milk would soon precipitate a heavy coat of solid material in the holes of the filter which would be impossible to clean and which would rapidly close up the apertures and stop the flow of liquid. It was then necessary to clean out these thousands of holes by hand which was a highly time consuming and tedious procedure.

Filters of a somewhat similar design have been previously suggested, as for instance Johnson, U. S. Pat. No. 793,725; Anderson, U. S. Pat. No. 915,650 and Kidd, U. S. Pat. No. 2,157,668, however, all of these required special gaskets, filtering pads, as well as high pressure filtering. For sanitary reasons the facility for cleaning all parts in every nook and cranny is of the utmost importance, and this consideration has led to numerous improvements in the construction of the filters which will be hereinafter described. One consideration of the utmost importance is the cost of the filter discs which, as previously made, were entirely too high and prohibited the use of filters to any great extent. To reduce the cost and to make a perfect filtering disc of a much simplified but more satisfactory design, I have devised a new disc made out of a single thin sheet of metal which is pressed into the desired shape in a die thereby greatly reducing the cost of the disc, eliminating waste of material and making it possible to produce thousands of discs in the same die, all exactly alike and with the most desirable characteristics at a low cost. Another important consideration is the filtering pad to be used. With the filters, as previously used, the pads were thick mats of fibrous materials which were costly and could not be thrown away and which had to be cleaned after each use. In my present invention, I make use of thin cotton filtering pads of such a simple construction and of such low cost that they can be thrown away after each use thereby eliminating a great deal of trouble without increasing the cost of filtering to any appreciable extent.

In particular, my filter handles cold milk and is specially adapted to low pressure filtering by gravity alone. The filter removes all dirt before it can become dissolved by the pasteurizing process and thereby removes off-flavors and unpleasant odors which might arise from the impurities in the milk. The milk thus retains its original natural and wholesome flavor without injury to the cream line.

An object of my invention is, therefore, to supply a filter having a large filter area in a small cubical content.

An ancillary object to the above is to provide a filtering disc of new and novel design which can be produced from a single piece of sheet metal at low cost and in large quantities.

Another object of this invention is to provide a filter unit requiring low pressure and having single, thin, low cost filtering pads which may be discarded after each use.

A further object of my invention is to provide a filter unit of low manufacturing cost, capable of filtering liquids at a minimum cost per gallon.

Still another object of this invention is to provide a filter unit of a design which is easily demountable and which will meet all sanitary requirements for proper cleaning, freedom from deterioration, etc.

Other objects and advantages of the invention will be apparent during the course of the following description.

In the accompanying drawings, forming a part of this specification, and in which like numerals are employed to designate like parts throughout the same, Figure 1 is a side elevation of an assembled filter embodying the invention.

Figure 4 is a plan view of a filter disc.

Figure 5 is a partial section along line 5—5 in Figure 4.

Figure 6 is a central cross section through the disc shown in Figure 4, taken along line 6—6, and Figure 7 is a partial section along line 7—7 in Figure 4.

Figure 1:
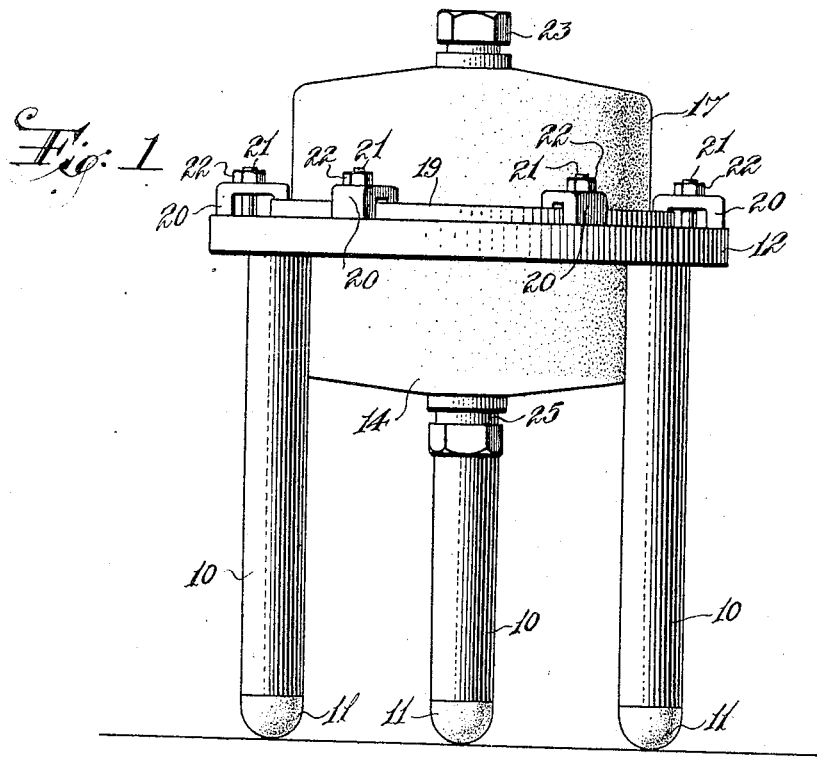
Figure 2:
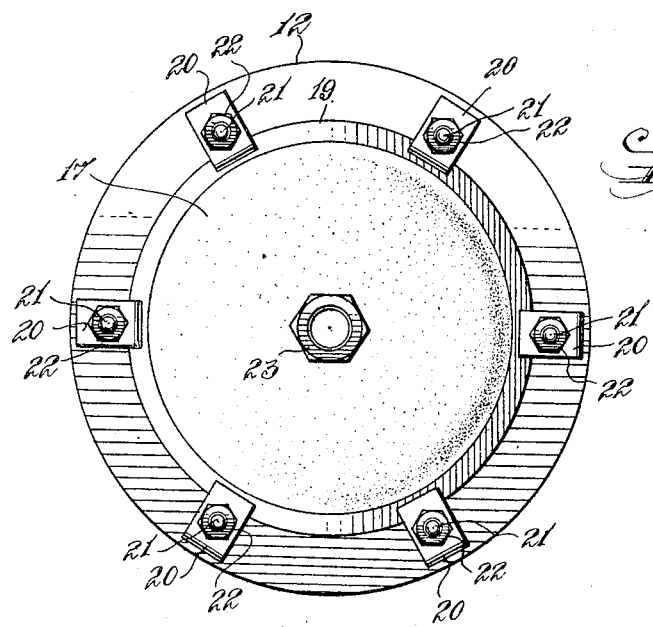
Figure 2 is a plan view of the same filter.

In the drawings, wherein for the purpose of illustration, is shown a preferred embodiment of my invention, the numeral 10 designates the tubular legs of the filter furnished with semi-spherical buttons 11 at their lower ends. An annular ring 12 forms the mounting base supported by the legs 10. The ring 12 has a recess 13 into which the flange 14 of the lower filter housing 15 is placed. A gasket 16 is placed over the flange 14 and the upper container 17 is placed with the flange 18 resting on top of the gasket 16. A locking ring 19 is placed on top of flange 18 and a plurality of U shaped clamps 20 are used to apply pressure upon the locking ring 19 by means of bolts 21 and nuts 22. By thus tightening nuts 22, the locking ring 19 will squeeze the flanges 14 and 18 together against the gasket 16 and thus making a water-tight connection between the lower container 15 and the upper container 17.

The upper container 17 has an inlet pipe connection 23 which is preferably placed in the center of same. In the center of the lower container 15 is placed a vertical stand-pipe 24, the lower end of which extends outside of the container 15 and furnishes an outlet pipe connection 25. The stand-pipe 24 is removably mounted in the bottom of the container 15 by means of nuts 26 and 27 with a pressure gland 28 providing a water-tight connection between nuts 27 and the container 15.

The nut 26 also forms a support upon which the filter discs 29 are supported when the same are stacked upon the stand-pipe 24. The filter discs 29 are usually made of the same size and the capacity of a given filter is merely depending upon the number of discs used. Filters of larger capacity therefore, need only a larger number of filter discs and a longer stand-pipe. Between each of the filter discs 29 are placed filter pads 30 which are supported upon the edges and ridges of the filter discs 29. These filter pads are preferably made from thin cheesecloth, specially treated and having the proper mesh.

The top of the stand-pipe 24 is closed by the cap nut 31 which has a shank 32 that extends down over the inner edge of the last filter disc 29 thus closing the holes in same and preventing the liquid from entering the stand pipe from outside. The nut 31 is also closed on top and is, therefore called a cap nut.

The filter discs 29 are shown in detail in Figures 4, 5, 6 and 7. Each disc is made from one piece of metal and is pressed into the shape clearly illustrated by the views shown in Figures 4, 5, 6 and 7. Each disc has a solid outer edge 33 which usually has four apertures 34 equally divided around the circumference. In a similar manner each disc has an inner edge 35, which similarly to the outer edge 33, is also perpendicular to the plane of the disc. The inner edge 35 also has a plurality of apertures 36, usually four in number, and these are preferably only one quarter the size of the apertures 34 in the outer edge. The discs 29 furthermore have a large center hole 37 with a small inwardly directed flange 38 extending from the inner edge 35. As will be shown hereinafter, this small flange represents a very important improvement and has an essential function in the operation of the filter.

The plane of the filter discs 29 has a plurality of annular ridges 39 which are pressed from the metal of which the disc is made and which extend along circular lines of different radius. None of these ridges, however, form a complete circle, the continuity of the ridges being broken at several points on the circumference of each circle but the ridges of different radius are broken at points which are not opposite to one another whereby an important function is obtained as will be shown below.

The discs 29 furthermore have inner hub portions 40 the lower edge of which is in the same plane with the lower extremity of the outer edge 33. The upper face of the flange 38 is furthermore in the same plane with the upper edge of the various ridges 39 and with the upper extremity of the outer edge 33.

The filter discs 29 are preferably made from aluminum, stainless steel or monel metal because these materials are most satisfactory from the standpoint of corrosion and sanitary considerations. Due to the novel construction of the filter discs with the inwardly directed flange 38 and the inner hub portion 40, the assembly on a standpipe with intervening filter pads 30 immediately becomes a solid and liquidproof unit upon tightening of the nut 31 thereby preventing any milk from going directly through without passing through the filter pads. The tightening of the nut 31 forces the flexible discs 39 together in such a way as to remove any openings due to a slight warping of the discs. The flexible construction of the single sheet filtering disc 39 is, therefore, of great importance in the present invention. It is furthermore to be considered that due to the thin wall of the material used to fabricate the disc 39, there are no deep holes to be cleaned and a much more sanitary construction is possible compared to older filtering discs such as shown in the patents referred to supra where holes and narrow and inaccessible ridges made thorough cleaning impossible. The present construction of the filter disc furthermore permits a reduction in cost of same to approximately one-twelfth the cost of a machined disc of the latter type. This alone has made possible the wide application of the present filter.

The operation of my invention is as follows:

After a thorough cleaning, and with the clamps 20 released and the locking ring 19 and the upper housing 17 removed, the first filter disc 29 is placed upon the stand-pipe 24 resting with its inner hub portion 40 upon the nut 26. The smooth face of 38 against the flat face of 26 will seal this end even without a gasket. A filter pad 30 is then placed over the disc 29 and the following discs are stacked one over the other with one filter pad between each. The cap nut 31 finally tightens the entire stack and seals the entrance of the stand-pipe by means of shank 32 as explained supra.

Figure 3:
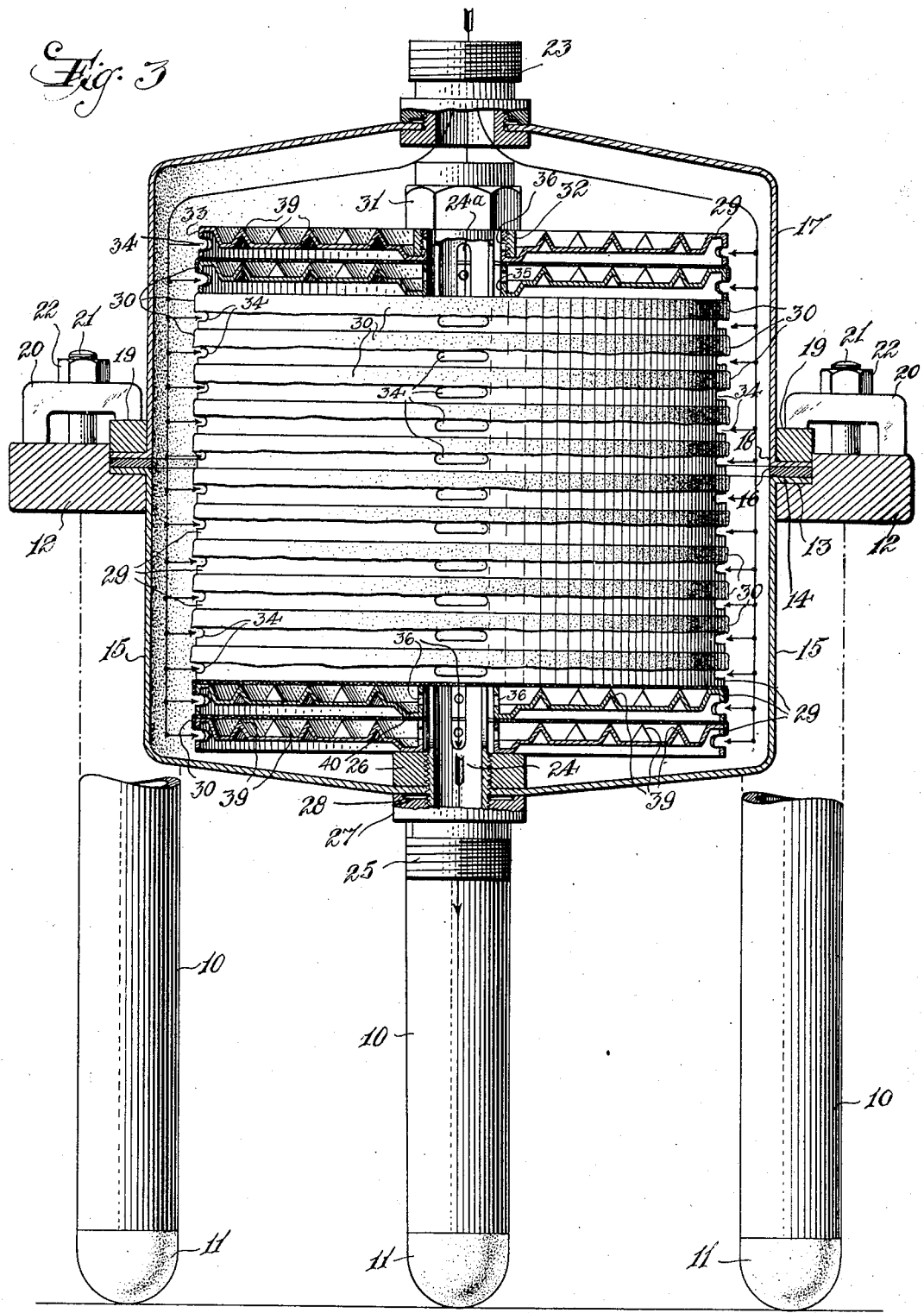
Figure 3 is a partial section illustrating by arrows the direction of the flow of liquid.

The gasket 16 is now placed over flange 14 and the housing 17 is placed on top, as shown in Figure 3, and finally locked in place by means of ring 19 and the tightening of the clamps 20.

The filter is now ready for operation and a liquid may be allowed to flow through same from top to bottom as indicated by arrows in Figure 3. As previously stated, the stack of filter discs is now sealed at both ends and the liquid can only enter through the holes 34 on the outer periphery. The liquid will then enter through these holes on one side of each disc and will flow downwardly through the filter pads 30 into the grooves between ridges 39 of the disc below and will thereupon flow through the breaks and grooves between ridges 39 toward the inner edge 35 and through the holes 36 in same. Due to the fact that these holes 36 are smaller than the holes 34 in the outer edge, a certain back pressure is created which assures an even distribution of liquid over the entire filtering pad 30. The liquid will then flow through the holes 36 into the space between the inner edge 35 of the discs 29 and the stand-pipe 24 and thereupon through the slots 24—a into the stand-pipe 24 and down through same through the outlet connection 25.

It should be noted that due to the unique construction of the filtering discs, the liquid is made to enter on one side of the same and flow through the hollow channels provided on that side and thereupon flowing through the filtering pads entering another set of hollow channels provided on the other side of the next adjacent filter disc and finally to leave same through the holes 36 in the inner edge 35. This particular construction permits great simplicity in the disc and permits the use of only one filter pad instead of two, as for instance, indicated by Johnson supra. The inner hub portion 40 furthermore provides a seal between each disc and the next adjoining one and the ridges 39 provide a support for the filtering pad, thereby preventing sagging of same.

It is obvious too from the unique construction of my invention that the entire filter may be reversed and the inlet pipe connection may thus be at the bottom and the outlet at the top, thus reversing the direction of flow indicated in Figure 3. In this position, however, the filter discs 29 have to be reversed also.

It is to be understood that the form of my invention herewith shown and described, is to be taken as a preferred example of the same and that various changes in the shape, size, and arrangement of parts may be resorted to, without departing from the spirit of my invention or the scope of the subjoined claims.

Having thus described my invention I claim:

1. A filter unit of the character described, comprising an annular ring supported upon a plurality of legs; a housing comprising two halves, an upper and a lower, said halves each having a flange at their junction, said flanges resting upon said annular ring; a gasket placed between said flanges; a locking ring placed over the flange of the upper half of the housing; clamping means whereby said flanges are securely tightened against said annular ring; an inlet pipe connection on top of the upper half of the housing; a stand-pipe, the lower end of which forms the outlet connection, fastened in the centre of the lower half of said housing; a plurality of pressed metal filter discs arranged upon said central stand-pipe, said filter discs being pressed from one piece of sheet metal and having concentric, discontinuous rings and grooves of raised metal and a solid outer edge with a plurality of apertures as well as an inner, central edge with smaller apertures leading to said central stand-pipe; a plurality of thin cloth filter pads, one between every two of said filter discs, and a nut capping said central stand-pipe whereby said filter discs are held rigidly together.

2. A filter unit of the character described, comprising an annular ring, horizontally supported upon a plurality of legs; a housing comprising two parts, an upper and a lower, said parts each having a flange at their junction, said flanges resting concentrically in an annular recess in said ring; a gasket placed between said flanges; a locking ring placed over the flange of the upper part of the housing; clamping means whereby said flanges are securely tightened down against said annular ring; an inlet pipe connection located centrally upon the upper part of said housing; a stand-pipe having longitudinal slots and the lower end of which forms the outlet connection, fastened in the centre of the lower part of said housing, a plurality of pressed metal filter discs concentrically mounted upon said central stand-pipe, said filter discs being pressed from one piece of sheet metal and having concentrically formed discontinuous rings and grooves pressed in the metal and a solid outer edge with a plurality of apertures as well as an inner, central edge with smaller apertures leading to said central stand-pipe, said inner edge also having an inwardly extending flange the edge of which forms a hole fitting tightly over said central stand-pipe; a plurality of thin cloth filter pads, one between every two of said filter discs, and a nut capping said central stand-pipe, whereby said filter discs are held rigidly together.

3. A filter disc of the character described comprising a circular piece of sheet metal having a downturned outer edge forming a solid annular ring around the periphery of the disc and extending a short distance at right angles to the plane of the disc, said outer edge having a plurality of apertures; the plane of the disc being formed into a plurality of concentrically arranged discontinuous rings and grooves pressed into the metal and having a large central hole around which the metal of the disc forms a flange with an inner hub, vertical to the plane of the disc, a short distance away from the edge of said central hole, and said inner edge having apertures of a smaller cross section than those in said outer edge.

4. A filter disc of the character described comprising a circular piece of sheet metal having a downturned outer edge forming a solid annular ring around the periphery of the disc and extending a short distance at right angles to the plane of the disc, said outer edge having a plurality of apertures; the plane of the disc being formed into a plurality of concentrically arranged discontinuous rings and grooves pressed into the metal and having a large central hole around which the metal of the disc is turned up to form a flange with an inner hub shaped portion vertical to the plane of the disc and having a flange extending inwardly from said hub at the top of the disc, said flange being in the plane of the disc, and said hub shaped portion having apertures of a smaller cross section than those in said outer edge.

5. A filter disc of the character described comprising a circular piece of sheet material formed into the shape of a wheel and having an outer rim perpendicular to the plane of the disc, said rim having a plurality of elongated holes, the plane of said disc being formed into a plurality of concentrically arranged discontinuous rings and grooves pressed in the metal in such fashion that the raised portions are all in the plane of the top side of the disc while the bottoms of the grooves are raised a small distance above the plane of the bottom side of the disc, said disc furthermore having a central hub formed out of the sheet material and having a flat end surface on both sides in the plane of both top and bottom sides of the disc, said hub also having a plurality of apertures of smaller cross section than said elongated holes in the outer rim, and an inwardly directed flange on the top side of said hub, said flange forming a continuous closure around the center hole of said disc.

6. A filter unit of the character described, comprising an annular ring supported upon a plurality of legs; a housing comprising two halves, an upper and a lower, said halves each having a flange at their junction and being made from a non-corrosive, stainless material, said flange resting upon said annular ring; a gasket placed between said flanges; a locking ring placed over the flange of the upper half of the housing; clamping means whereby said flanges are securely tightened against said annular ring; an inlet pipe connection on top of the upper half of the housing; a stand-pipe, the lower end of which forms an outlet connection fastened in the center of the lower half of said housing; a plurality of pressed metal filter discs arranged upon said central stand-pipe, said filter discs being pressed from one piece of non-corrosive, stainless metal and having concentric discontinuous rings and grooves of raised metal and a solid outer edge with a plurality of apertures as well as an inner central edge with smaller apertures leading to said central stand-pipe; a plurality of thin cloth filter pads, one between every two of said filter discs, and a nut capping said central stand-pipe whereby said filter discs are held rigidly together.

7. A filter disc of the character described, comprising a circular piece of non-corrosive, stainless sheet metal formed into the shape of a wheel and having an outer rim perpendicular to the plane of the disc, said rim having a plurality of elongated holes, the plane of said disc being formed into a plurality of concentrically arranged discontinuous rings and grooves pressed in the metal disc in such fashion that the raised portions are all in the plane of the top side of the disc with corresponding grooves on the under side of the disc, while the bottoms of the intervening grooves between said raised ring shaped portions, are raised a small distance above the plane of the bottom side of the disc, said disc furthermore having a central hub formed out of the non-corrosive stainless sheet metal and having a flat end surface on both sides in the plane of both top and bottom sides of the disc, said hub also having a plurality of apertures of smaller cross section with said elongated holes in the outer rim, and an inwardly directed flange on the top side of said hub, said flange forming a continuous closure around the central hole of said disc.

ALFRED L. STAMSVIK.